Patented Sept. 24, 1940

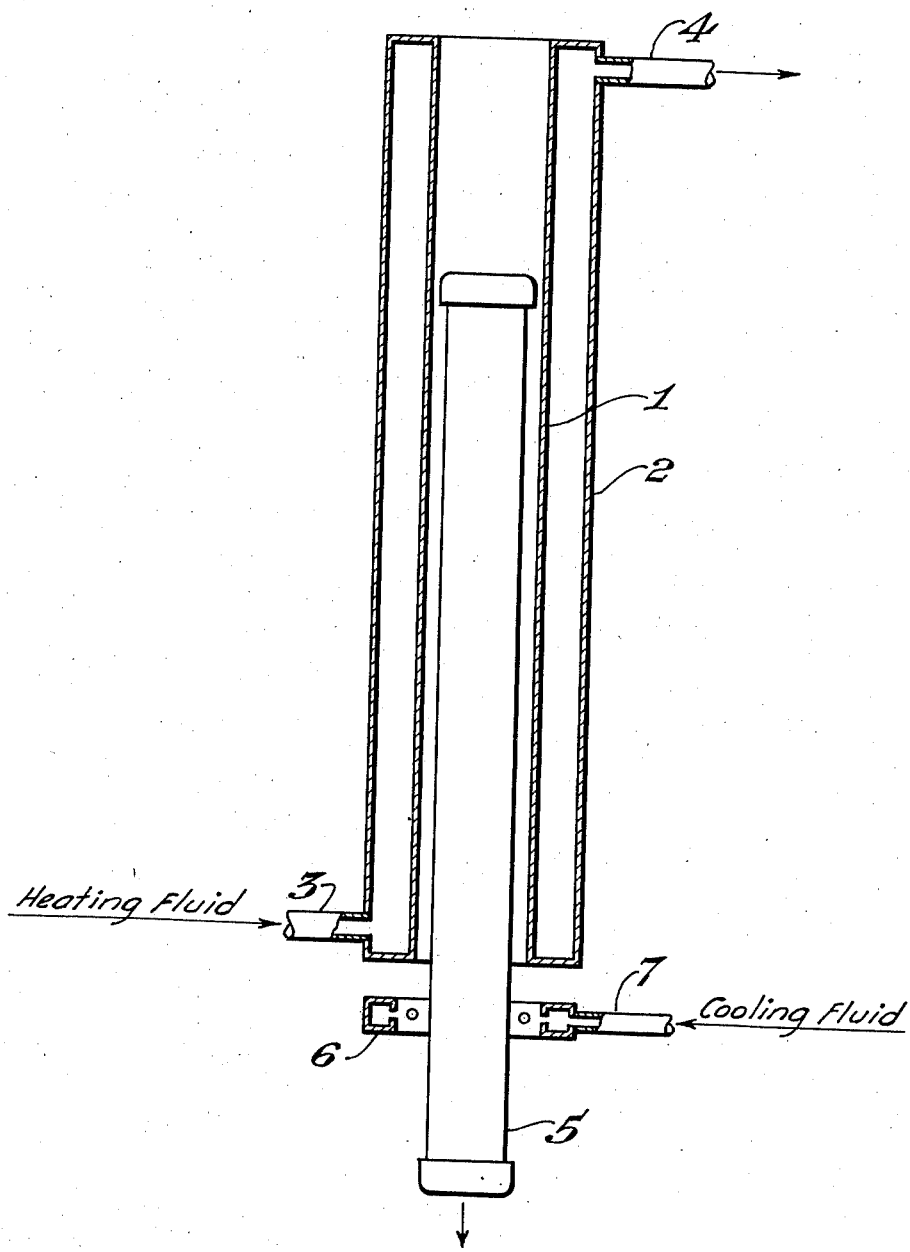

2,215,733

UNITED STATES PATENT OFFICE 2,215,733

MANUFACTURE OF UNIFORM RESINOUS ARTICLES

Donald L. Gibb and Richard D. Freeman, Midland, Mich., assignors to The Dow Chemical Company, Midland, Mich., a corporation of Michigan Application February 3, 1938, Serial No. 188,463

8 Claims. (Cl. 18—55)

This invention concerns an improved method for manufacturing resinous polyvinyl articles which are free of bubbles and other flaws. By a "polyvinyl" article is meant a shaped article composed of a polymerized vinyl type of compound.

A considerable number of vinyl type compounds, e. g. styrene and its homologues and analogues, ethyl acrylate, methyl-alpha-methacrylate, etc., are known which may be polymerized to obtain solid resins having a variety of useful properties. The resinous products are generally thermoplastic in nature and may be molded at elevated temperatures to obtain articles of desired shape. In practice, the shaped resinous products are generally prepared either by polymerizing the vinyl compound within a mold or by heating scraps of other small pieces of the polymer to render them plastic or liquid and charging them into a mold wherein they solidify on cooling. However, resinous materials of the type just mentioned contract in volume both during formation by polymerization and during cooling from the elevated temperatures at which they are liquid or plastic. Due largely to such contractions, polymerized articles prepared as just described frequently contain gas and/or vacuum bubbles and usually contain internal stresses and strains caused by uneven contraction during solidification.

The tendency toward development of such imperfections varies somewhat with the different resins of the polyvinyl type. In general, the imperfections, particularly formation of vacuum bubbles and internal strains, occur most frequently in resins having the greatest thermal coefficient of expansion, and for any given polyvinyl resin they occur more frequently as the least dimension of the molded products becomes greater. Imperfections of the kinds just mentioned frequently occur in molded polystyrene objects wherein the least dimension, or thickness, is 0.25 inch or more and their occurrence is a particularly series problem in the manufacture of polystyrene products having a thickness of 0.75 inch or more.

Certain methods for avoiding or overcoming the above difficulties have heretofore been suggested. For instance, Ostromislensky in U. S. Patent No. 1,683,402 teaches that an imperfect polystyrene rod containing vacuum bubbles and internal strains is obtained when a column of liquid styrene having a height more than 6.5 times its diameter is polymerized in a vertical tubular mold, but he states that a rod free of such defects may be prepared by maintaining the tubular rod in a horizontal position during the polymerization. However, the same patent further points out that the rod obtained by this last mentioned operation has a flattened side and must thereafter be machined or press-molded in order to obtain a perfect cylindrical rod. Kuettel in U. S. Patent No. 2,063,315 teaches that a polyvinyl article free from bubbles and strains may be prepared by pouring a thin layer of unpolymerized or partially polymerized vinyl compound into the bottom of a mold, polymerizing this thin layer to a solid, and then pouring in a second thin layer on top of the first and polymerizing it, etc., until the mold is filled. Obviously, such mode of operation is time-consuming and requires very careful manipulation.

An object of this invention is to provide a simple and practical method for preparing polyvinyl articles which are free of bubbles, fissures, cracks, and are substantially free of internal strains and other flaws.

The annexed drawing is a diagrammatic sketch of one of the various forms of apparatus which may be employed in practicing the invention. In the drawing, the numeral 1 designates a heating chamber provided with a jacket 2 through which a heating fluid may be circulated by way of inlet 3 and outlet 4, respectively. The heating chamber 1 has an opening at its bottom through which a mold may be inserted or withdrawn. The numeral 5 designates a mold partially withdrawn from the heating chamber 1. The numeral 6 designates a section of a circular cooling device which circumscribes the mold 5 and is provided with the jets indicated for directing a cooling fluid against the mold at a point adjacent to that at which the mold projects into chamber 1. The cooling device 6 is provided with a cooling fluid inlet 7. It will be understood by those skilled in the art that any of a variety of other forms of apparatus may satisfactorily be used in practicing the invention, and that the apparatus shown in the drawing is illustrative only and does not limit the invention. The mode of employing the apparatus of the drawing will be apparent from the following description of the invention.

According to the invention, a mold of desired shape is charged with a polymerized vinyl compound at an elevated temperature sufficient to render said polymer plastic, either by polymerizing the vinyl compound at such elevated temperature within the mold or by heating scraps or other pieces of the solid polymer to the aforesaid plastifying temperature, and pouring or pressing the plastic body into the mold. The particular procedure employed in charging the mold with the hot plastic polyvinyl resin is of minor importance, but the next operation now to be described is essential. This second operation consists in chilling one extremity of the polyvinyl body sufficiently to solidify the same while maintaining the remainder of the body at an elevated temperature sufficient to render the same plastic and very gradually extending this cooling action from the extremity of the body first cooled to the opposing extremity so that the entire body is eventually solidified. During such cooling there is, between the completely solidified portion and the relatively hot plastic portion of the polymer, a zone of material undergoing cooling and shrinkage. Best results are obtained when the cooling operation is conducted in such manner as to maintain this zone within which shrinkage occurs as narrow as possible, i. e. the cooling operation is preferably carried out so as to maintain the distance between the solid shrunken polymer and the relatively hot plastic polymer as small as possible. By operating in this manner only a small portion of the polyvinyl body is solidified and contracted at a time and the adjacent polyvinyl material is maintained in sufficiently plastic condition so that it may flow in the direction of the cooling and occupy the space which otherwise would be left vacant with resultant formation of bubbles and internal strains The cooling operation may be carried out in a variety of ways, e. g. by chilling and solidifying one extremity of the molded object, and gradually withdrawing the same from the lower end of the mold while maintaining the mold itself at an elevated temperature or by heating the entire mold in an oven or furnace and gradually withdrawing the mold from the heated zone while cooling the mold as it emerges from said zone so as to maintain a rather sharp line of demarcation between the solidified polyvinyl material and the plastic and readily flowable material within the mold. If desired, the mold may be constructed of glass, in which case the rate at which cooling may be extended from one extremity of the mold to the other may be controlled visually since the formation of bubbles during cooling takes place rapidly and if bubble formation is observed it will be known that the cooling is being extended too rapidly from one extremity of the polyvinyl body to the other. This fault may be corrected by reinserting the mold into the heated zone to a depth sufficient so that the defective portion of the polyvinyl body will again be rendered plastic and then more gradually withdrawing the mold from the heated zone into the relatively cold zone. After ascertaining the correct rate of cooling in the manner just indicated a non-transparent mold, e. g. of metal, may if desired be substituted for the glass mold of similar size and shape and subsequent operations using such non-transparent mold may safely be carried out to obtain flawless articles by conducting the cooling at substantially the same rate as when employing the glass mold.

The two operations discussed above are the essential operations of the process and of these two operations the cooling operation is by far most important. However, the operations just discussed, although avoiding occurrence of vacuum bubbles or serious strains within the solid polyvinyl article, do not always avoid occurrence of gas bubbles in the article. A method for avoiding such gas bubbles is described in the copending application Serial No. 167,597, filed October 10, 1937, of A. R. Gabel, wherein it is shown that the tendency toward formation of bubbles in polymerized styrene may be reduced by boiling the monomeric styrene just prior to polymerizing the same. This boiling operation is effective in avoiding formation of gas bubbles not only in polystyrene, but also in other polymerized vinyl products, e. g. polymers of methyl-alpha-methacrylate, para-ethyl styrene, para-methyl styrene, ortho-chlorostyrene, etc., and such boiling operation may advantageously be carried out prior to the subsequent operations of filling a mold with the hot plastic polyvinyl compound and gradually cooling the polymer from one extremity to the other as hereinbefore described.

*Example*

The following comparative experiments demonstrate the difference in results obtained when an entire body of a hot plastic polyvinyl resin is cooled gradually to ordinary temperature in known manner and when a body of the hot plastic resin of same size and shape is cooled gradually from one extremity to the other, while maintaining the uncooled portion at a plastifying temperature, in accordance with the invention. These experiments are illustrative and are not to be construed as limiting the invention.

*Experiment (a)*.—A tubular metal mold of approximately 1.75 inches internal diameter was filled to a depth of about 11.5 inches with liquid monomeric styrene which had just previously been boiled. The mold was closed, immersed in an oil bath, and the latter was heated at 125° C. for 3 days and then permitted to cool gradually to room temperature. By operating in this manner, the styrene was polymerized and the entire polymer was cooled gradually to room temperature. The mold was taken from the bath, opened, and the product removed. The product was an imperfect rod of polystyrene containing a number of bubbles. The bubbles varied in size from mere points to bubbles of about 0.5 to 0.75 inch diameter.

*Experiment (b)*.—Experiment (a) was repeated except that after completing the polymerization at 125° C., the mold was removed from the hot oil bath and placed in a heating chamber provided with an opening at its lower end through which the mold could be withdrawn. The temperature of the heating chamber was approximately 132° C. The mold was withdrawn lengthwise through said opening while blowing the mold with air at the point where it emerged from the chamber. The mold was lowered from the heating chamber through the jets of cold air at a rate of 2 inches per hour. After the mold was withdrawn from the heating chamber it was opened and the molded product removed therefrom. The product was a perfect polystyrene rod free of bubbles or other imperfections.

One end of each of the rods produced in the above Experiments (a) and (b) was cup-shaped.

Although the present invention is most readily applicable in manufacturing rods, bars, and other articles having greater length than width or diameter, it is not limited thereto but may be applied successfully in making solid polyvinyl articles of any desired shape, e. g. doll heads, brush handles, etc.

The invention may be applied not only in the initial manufacture of bubble-free polyvinyl articles, but also for the purpose of removing vacuum bubbles from preformed polyvinyl articles which contain the same. For instance, we have taken a polystyrene rod containing bubbles and reheated the same in a mold to about 130° C. in an oven and gradually withdrawn the mold from the oven while cooling the mold at the point at which it emerged from the oven and thereby recovered the rod in a form free of bubbles.

The invention as hereinbefore described may be employed for the manufacture of bubble-free articles composed of a variety of polyvinal resins. e. g. polystyrene; polymerized methyl-alpha-methacrylate; polymers of nuclear substituted styrenes such as orthochloro- or parachloro-styrene, ortho-ethyl- or para-ethyl-styrene, etc.; and co-polymers of styrene with other agents such as divinyl benzene, diallyl maleate, etc. All such polyvinyl resins may be employed in plasticized or unplasticized form, as desired.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method which comprises charging a mold with a polyvinyl resin heated to a temperature sufficient to render the same sufficiently plastic so that it is capable of flowing, cooling one extremity of the mold sufficiently to harden the resin while maintaining substantially the remainder of the mold at a temperature sufficiently high to maintain the polyvinyl resin therein in its plastic flowable condition and gradually extending the cooling from the extremity first cooled to the opposing extremity to obtain a solidified resinous product substantially free of bubbles.

2. The method which comprises boiling a polymerizable vinyl compound for a period of time sufficient to remove dissolved gases therefrom but insufficient to cause solidification, charging a mold with the vinyl compound, heating the mold to a temperature sufficiently high to polymerize the vinyl compound and to render the polymer sufficiently plastic so that it is capable of flowing and thereafter cooling one extremity of the mold sufficiently to harden the polymer while maintaining substantially the remainder of the mold at a temperature sufficient to maintain the polyvinyl compound in its plastic and flowable condition and gradually extending the cooling from the extremity first cooled to the opposing extremity to obtain a solid resinous product substantially free of bubbles.

3. The method which comprises boiling styrene, charging a mold with the same and heating the mold at a temperature sufficient to polymerize the styrene and to render the polymer sufficiently plastic so that it is capable of flowing, cooling one extremity of the mold sufficiently to harden the polymer while maintaining substantially the remainder of the mold at a temperature sufficient to maintain the polymer in its plastic and flowable condition and gradually extending the cooling from the extremity of the mold first cooled to the opposing extremity to obtain a molded resinous product substantially free of bubbles.

4. The method which comprises preparing a bubble-free solid resinous polyvinyl article having a thickness of at least 0.25 inch by cooling one extremity of a hot plastic body of the polyvinyl resin sufficently to harden it while heating substantially the remainder of the resinous body at a temperature sufficient to maintain the same in plastic and flowable condition and gradually extending the cooling from the extremity first cooled to the opposing extremity.

5. The method which comprises preparing a bubble-free solid resinous polyvinyl article having a thickness of at least 0.75 inch by cooling one extremity of a hot plastic body of the polyvinyl resin sufficiently to harden it while heating substantially the remainder of the resinous body at a temperature sufficient to maintain the same in plastic and flowable condition and gradually extending the cooling from the extremity first cooled to the opposing extremity.

6. The method which comprises preparing a bubble-free solid polystyrene article having a thickness of at least 0.25 inch by cooling one extremity of a hot plastic body of the polyvinyl resin sufficiently to harden it while heating substantially the remainder of the resinous body at a temperature sufficient to maintain the same in plastic and flowable condition and gradually extending the cooling from the extremity first cooled to the opposing extremity.

7. The method which comprises preparing a bubble-free solid polystyrene article having a thickness of at least 0.75 inch by cooling one extremity of a hot plastic body of the polyvinyl resin sufficiently to harden it while heating substantially the remainder of the resinous body at a temperature sufficient to maintain the same in plastic and flowable condition and gradually extending the cooling from the extremity first cooled to the opposing extremity.

8. The method which comprises heating a polyvinyl resin in a mold at a temperature sufficient to render the resin plastic and flowable and gradually withdrawing the mold from the heating zone to a zone of sufficiently lower temperature to cause cooling and hardening of the resin, whereby cooling of the resin is extended gradually from the extremity of the resin first cooled to the opposing extremity and a solid resinous product substantially free of bubbles is obtained.

DONALD L. GIBB.
RICHARD D. FREEMAN.